United States Patent [19]

Shimp et al.

[11] Patent Number: 5,105,326
[45] Date of Patent: Apr. 14, 1992

[54] CIRCUIT FOR CONTROLLING THE ORIENTATION OF A MAGNETIC FIELD

[75] Inventors: Alan B. Shimp, Monroeville; James I. Wise, Butler, both of Pa.

[73] Assignee: Westinghouse Electric Corp., Pittsburgh, Pa.

[21] Appl. No.: 708,328

[22] Filed: May 31, 1991

[51] Int. Cl.$^5$ .............................................. H02H 3/08
[52] U.S. Cl. ...................................... 361/49; 361/93; 361/102; 361/147
[58] Field of Search ...................... 361/42, 49, 47, 78, 361/93, 102, 147, 152, 206

[56] References Cited

U.S. PATENT DOCUMENTS

| | | | |
|---|---|---|---|
| 3,171,062 | 2/1965 | Rowe, Jr. | 361/42 |
| 4,279,007 | 7/1981 | Shimp | 361/47 |
| 4,358,810 | 11/1982 | Wafer et al. | 361/93 |
| 4,731,692 | 3/1988 | Dvorak et al. | 361/102 |
| 5,014,154 | 5/1991 | White | 361/49 |

Primary Examiner—Todd E. DeBoer
Attorney, Agent, or Firm—M. J. Moran

[57] ABSTRACT

A circuit for controlling the orientation of magnetic fields is provided. The circuit has particular application to a flux shunt trip device in a circuit breaker. The flux shunt trip device has a spring-loaded plunger which when released to its extended position causes the circuit breaker to trip. Under normal operating conditions, the plunger is maintained in a retracted position by the force of a permanent magnet. A trip coil is mounted adjacent to the plunger. When the trip coil is energized a magnetic flux is generated opposing the magnetic flux of the permanent magnet. When the opposing flux neutralizes the flux of the permanent magnet the spring-loaded plunger is released to its trip position. A control circuit is provided to aid in maintaining the plunger in its retracted position under high current conditions close to, but below, the trip value. This control circuit acts to reverse the direction of current through the trip coil under these conditions such that a magnetic flux aiding that of the permanent magnet is generated. If a trip current is detected, the control circuit allows the current to flow in the normal direction through the trip coil, thus generating a magnetic flux opposing the permanent magnet which causes the plunger to be released and the breaker to trip.

6 Claims, 3 Drawing Sheets

CIRCUIT FOR CONTROLLING THE ORIENTATION OF A MAGNETIC FIELD

BACKGROUND OF THE INVENTION

1. Field of the Invention

This invention relates generally to a circuit for controlling the orientation of magnetic fields. The circuit has particular application as a control circuit for a flux shunt trip device in a circuit breaker. The circuit counteracts the effects of external magnetic fields which could otherwise cause undesired nuisance tripping of the breaker.

2. Background Information and Description of the Prior Art

Circuit breakers with electronic trip units commonly employ a flux shunt trip device that incorporates permanent magnets. The flux shunt trip device has a spring-loaded plunger which when released to its extended position causes the circuit breaker to trip. Under normal operating conditions, the plunger is maintained in a retracted position by the force of the permanent magnet. A trip coil is wound in intimate contact with the plunger. When the trip coil is energized with current, a magnetic flux is thereby generated. This magnetic flux opposes the magnetic flux of the permanent magnet. When the opposing flux is of sufficient strength to counter-balance the magnetic flux of the permanent magnet, the spring force on the plunger then causes the plunger to move to its trip position.

Due to the restricted space available inside a circuit breaker, it is often necessary to mount the shunt trip adjacent to the phase conductor and associated current transformers. A problem has been encountered at high current levels because the current in the phase conductor and current transformers create a separate magnetic flux which can act to oppose the flux of the permanent magnet and thereby cause the shunt trip to trip the breaker prior to reaching the trip current value. This results in undesired nuisance tripping.

One solution to the nuisance trip problem is disclosed in U.S. Pat. No. 4,731,692. This patent requires two coils on the shunt trip device: an assist coil and a trip coil. The trip coil acts in the manner discussed hereinbefore. The assist coil acts to assist the action of the permanent magnet. More specifically, the permanent magnet flux and assist coil flux act to hold the plunger in a retracted position. When a trip condition occurs, the trip coil flux and the phase conductor flux act to assist movement of the plunger to the extended, tripped position.

The assist coil is energized only when the current through the phase conductor increases to a level such that the flux generated by the external phase conductor begins to overcome the permanent magnet flux. Without the assist coil, the spring force would move the plunger to the extended position. The energized assist coil creates a flux which aids the permanent magnet in retaining the plunger in the retracted position until the trip coil is energized by an associated electronic trip circuit signal. The two coils required by this arrangement increase the cost of the circuit breaker. In addition, more space may be required to mount the additional coil.

There remains a need for a device which overcomes the effects of magnetic flux in electronic circuits. More particularly, there remains a need for a device which will reduce the effects of flux created by the conductor or associated current transformers mounted in close proximity to a flux shunt trip device in a circuit breaker. There remains a further need for a device which can be used with the single trip coil which already exists in the device.

SUMMARY OF THE INVENTION

These and other needs are satisfied by the device of the present invention which provides a control circuit which reverses the flow of current through the trip coil, thereby reversing the orientation of the magnetic flux created by the current. In the particular application of the flux shunt trip device in a circuit breaker, the circuit of the present invention acts to resist the effects of the stray magnetic field by creating an assisting magnetic flux which will assist the magnetic flux of the permanent magnet. Specifically, a control circuit is provided in connection with the electronic trip circuit in the flux shunt trip portion of the circuit breaker. The circuit controls the direction of current through the trip coil. More specifically, as is the case with the conventional flux shunt trip device, the current will pass in a first direction in a trip condition, the first direction being chosen such that the magnetic flux created when the trip coil is energized will oppose the magnetic flux created by the permanent magnet. When the magnet flux so generated by the energized trip coil becomes sufficient to essentially neutralize or cancel the magnetic flux generated by the permanent magnet, a spring biasing the plunger of the flux shunt trip device will act to force the plunger into its extended trip condition and the circuit breaker will trip.

In accordance with the present invention, a threshold current is chosen at which the external magnetic fields begin to have an adverse effect on the operation of the shunt trip device. This current level is designated to be the threshold level. The threshold value is a high current value, but is below the trip current level for the breaker. The trip circuit is designed to generate a signal when the threshold level has been reached or exceeded.

When the signal is issued by the trip circuit that the threshold has been reached, a pair of transistors in the control circuit of the present invention turn on and when activated, cause current to flow in a direction through the trip coil which is opposite to the direction in which it flows under trip conditions. When the current flows in the reverse direction through the trip coil, a magnetic flux is generated which aids the magnetic flux of the permanent magnet. Since the two fluxes are aiding, the plunger of the shunt trip device is held in with greater force than normal. This aiding flux is sufficient to allow the total flux in that direction to oppose the external flux generated by the associated conductor and transformers to avoid the problem of nuisance tripping. The control circuit is designed such that when a trip signal is generated by the trip circuit, an opposite set of transistors are activated in the circuit, which act to direct the current through the trip coil in the trip direction. This generates a magnetic flux which reduces or cancels the magnetic flux of the permanent magnet which then allows the spring force on the plunger to cause the plunger to move to the trip position thereby allowing the breaker to trip.

This description of the circuit assumes that the threshold level is below the calibrated trip current value for the breaker. In other words, the control circuit of the present invention operates in the range of current values between the threshold and the trip current value. There may be instances in which a short delay is desired. In such a case, the control circuit of the present invention allows the tripping function to immediately occur in the normal manner and no change in direction of current or magnetic flux is performed as it is unnecessary in such a case.

If desired, the control circuit of the present invention can be used in any application in which it is desirable to reverse direction of current in order to create an opposing magnetic field.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

Figure 1:
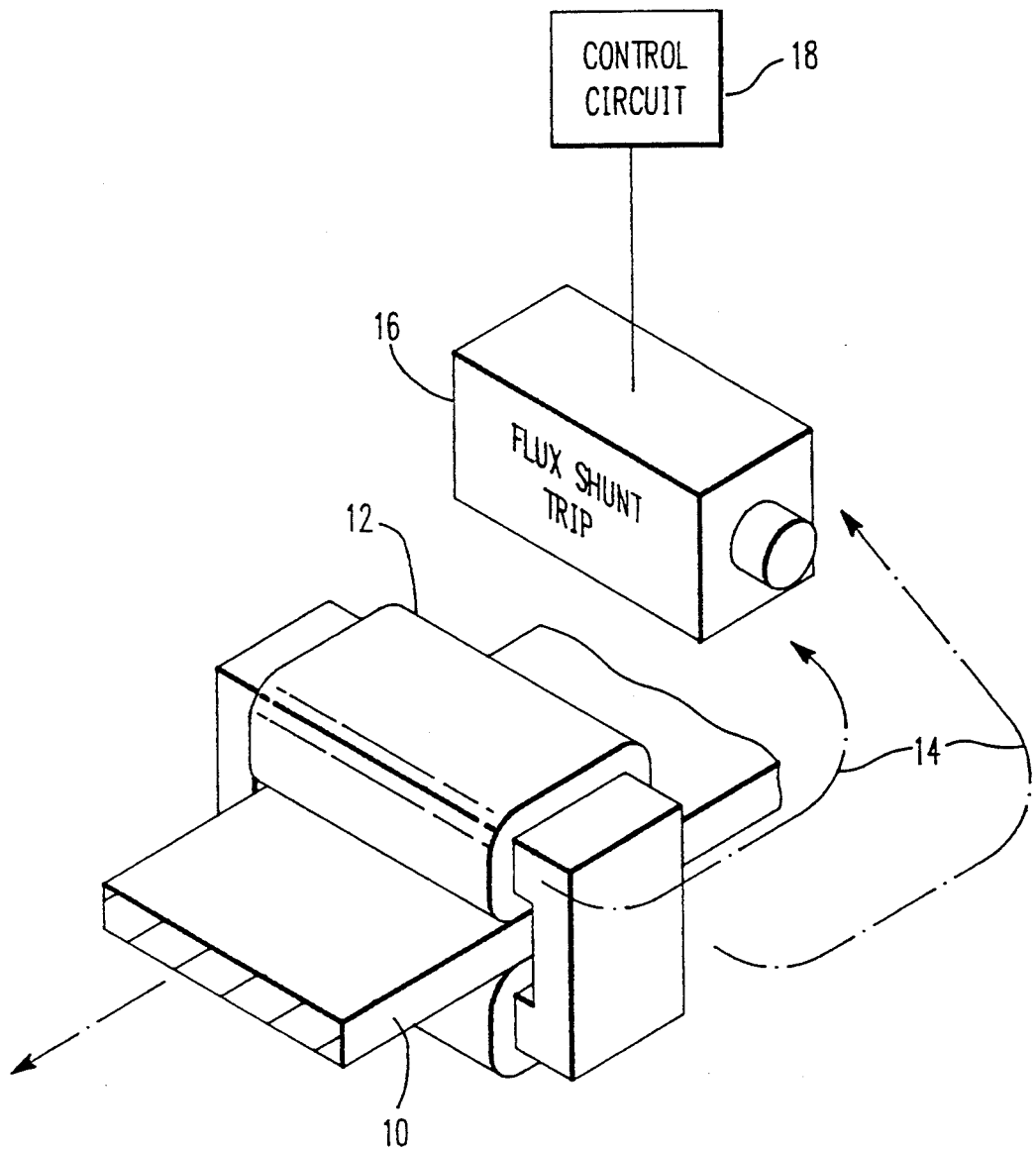
FIG. 1 is a schematic isometric illustration of the flux shunt trip device and the primary conductor as well as a current transformer associated with the circuit breaker which includes the flux shunt trip device.

Referring to FIG. 1, the primary current conductor for one phase of a power system is designated by reference character 10. Current transformer 12 encircles conductor 10 and generates a signal proportional to the current flowing in the conductor 10. The magnetic flux generated by current transformer 12 and current conductor 10 is depicted by flux lines 14 in FIG. 1. As discussed hereinbefore, the flux 14 is in close proximity to flux shunt trip device 16 of the associated circuit breaker. The control circuit of the present invention is schematically illustrated as 18 in FIG. 1 and is discussed in further detail below. As stated above, the flux created by conductor 10 and current transformer 12 can interfere with the balance between the magnetics and spring force within the flux shunt trip device to cause nuisance tripping at current values below the trip value.

Figure 2:
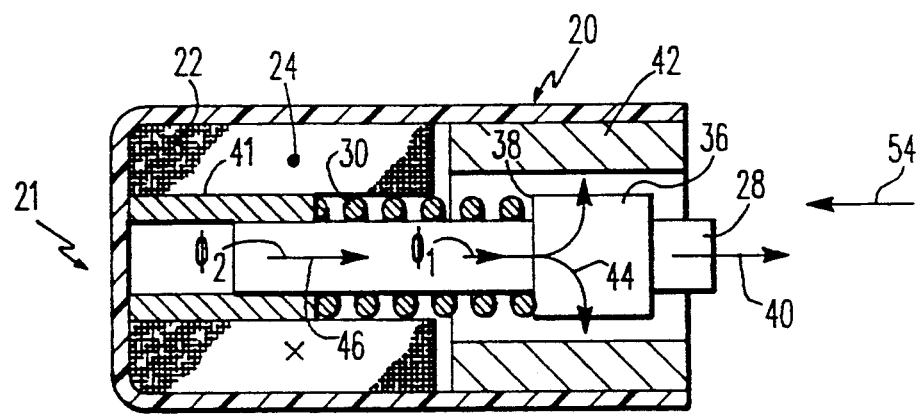
FIG. 2 is a schematic cross sectional illustration of the flux shunt trip device of FIG. 1 with the flux lines shown in the assisting direction.

This may be understood more particularly with reference to FIG. 2. Flux shunt trip device 20 is encased within housing 21. Housing 21 is positioned within the associated circuit breaker such that plunger 28 is capable of striking a mechanism (not shown in FIG. 2) in the circuit breaker in order that current through the conductors will be interrupted in a trip situation. Trip device 20 has circular coil 22 which may be energized with current flowing in either direction. In FIG. 2, the current is flowing in a first direction schematically depicted by dot 24. As mentioned above, flux shunt trip device 20 has plunger 28 which is movable within housing 20 between a retracted position and an extended position which occurs under trip conditions. Plunger 28 preferably has head portion 36 which is of a larger diameter than the remainder of plunger 28. Compression spring 30 bears against head portion 36 urging the plunger 28 towards the extended position. The plunger 28 proceeds in the direction depicted by arrow 40 when it moves to the extended position. Tubular spacer 41 is placed in housing 21 to act as a stop for spring 30.

Permanent magnet 42 creates a flux $\phi_1$ which is generated in the direction depicted by the arrows generally designated by reference character 44. The coil 22 when energized also creates a magnetic flux. When the current through the coil passes in a first direction the flux $\phi_2$ is created in the direction depicted by arrow 46 in FIG. 2. This flux aids flux $\phi_1$ of the permanent magnet and this aiding flux resists the flux of the external field which could otherwise cause the spring force to become the dominant force in the circuit thus urging the plunger into the trip position.

Figure 3:
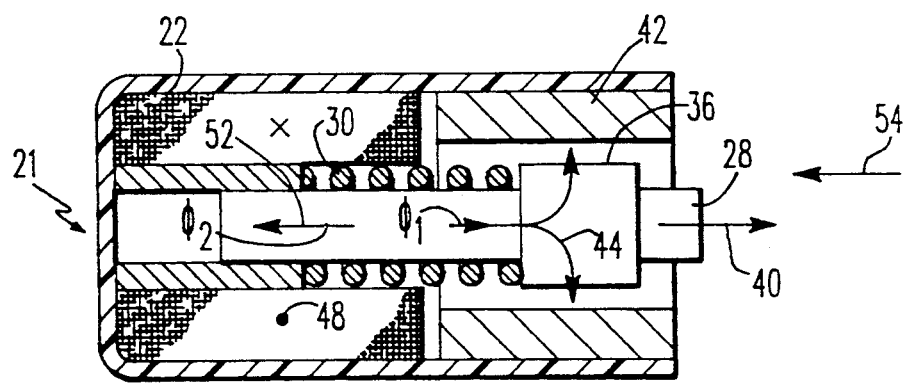
FIG. 3 is an illustration of the device of FIG. 2 with the flux lines shown opposite to the assisting direction.

The trip condition is shown in FIG. 3. The current through coil 22 flows in the opposite direction as that depicted in FIG. 2 as shown by the dot which is designated reference numeral 48. When flux flows in the direction depicted in FIG. 3 this flux opposes the flux of the permanent magnet. The flux $\phi_1$ of permanent magnet 42, is shown by arrows 44. That flux is always oriented in the same direction. However, in the condition shown in FIG. 3, the flux generated by the coil $\phi_2$ in the opposite direction which is designated by arrow 52. This oppositely generated flux bucks flux $\phi_1$ which then allows the spring force of spring 30 to urge plunger 28 in the direction of arrow 40 by engaging head 36 on plunger 38. In both FIGS. 2 and 3, the external field generated by the external components such as the conductor and the transformer is shown by the arrow designated by reference character 54.

Figure 4:
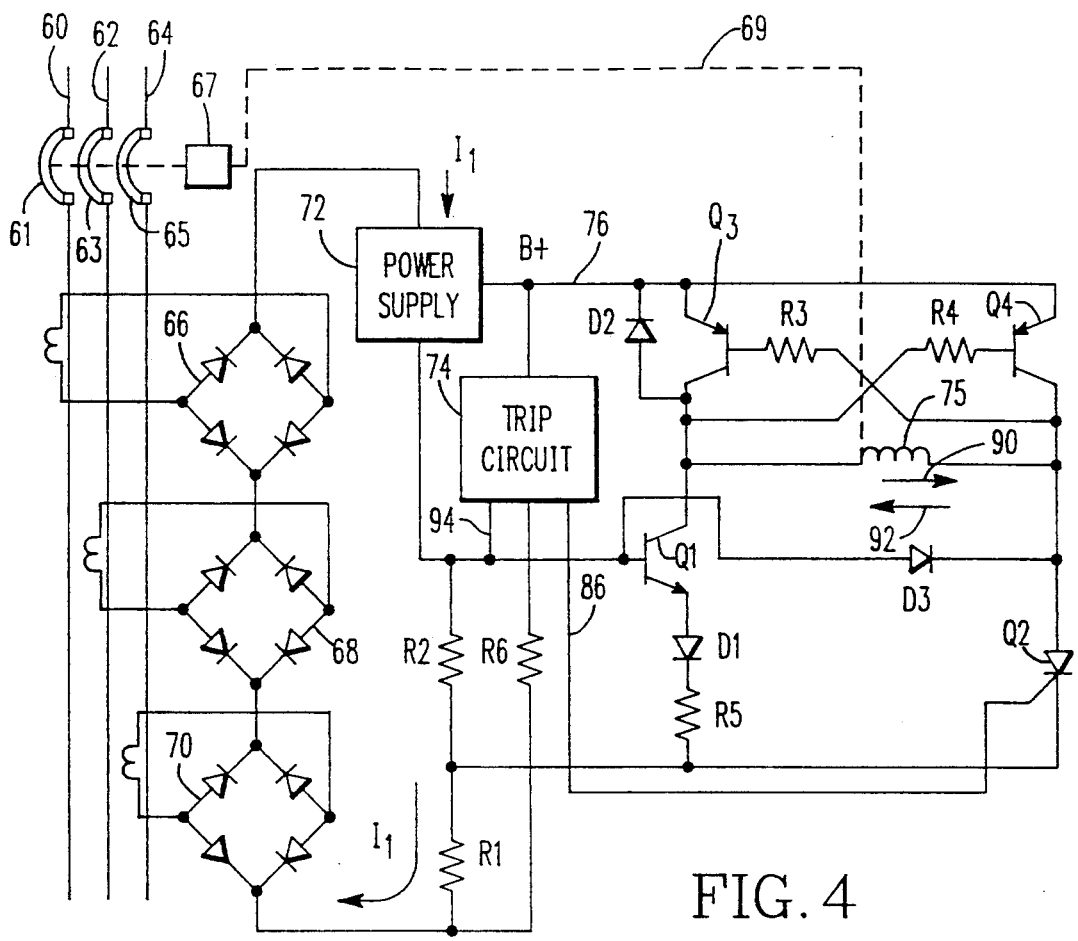
FIG. 4 is a circuit diagram for one embodiment of the control circuit of the present invention.

Referring now to FIG. 4, the control circuit of the present invention will be discussed. The conductors for the three phases of the power line are shown in FIG. 4 as conductors 60, 62 and 64. Separable contacts 61, 63 and 65 on conductors 60, 62 and 64, respectively, are operatively associated with plunger 67. The operation of plunger 67 under the control of trip coil 75 was described hereinbefore with reference to FIG. 2. Conductor 60 is inductively coupled to full-wave bridge circuit 66. Similarly, conductor 62 feeds bridge circuit 68 and conductor 64 energizes bridge circuit 70. The dc outputs of these bridge rectifiers are connected in series to form an auctioneering circuit. The auctioneering circuit generates an output current proportional to the highest current flowing in any of the circuit breaker poles 60, 62 or 64. This output current $I_1$ flows into power supply 72 of the control circuit of FIG. 4. Current $I_1$ also flows through power supply 72 into electronic trip circuit 74 and into resistors R1 and R2 shown in FIG. 4. The function of power supply 72 is to maintain the voltage of the B+ bus designated by reference character 76 in FIG. 4. This bus energizes a trip circuit 25 74. The voltages across R1 and R2 are proportional to $I_1$ The value of R2 is chosen so that the voltage across it never exceeds a few volts even for the highest expected value of $I_1$. Resistor R1 is used to calibrate the rated current of the breaker and it may be varied in value as required.

Resistor R6 which is connected between the trip circuit 74 and the calibrating resistor $R_1$ is of a relatively high value and is used to supply intelligence to the trip circuit 74.

The control circuit of the present invention is connected to the trip circuit 74 and the flux shunt trip oil 75 of the associated circuit breaker. The control circuit includes two pair of solid state switches which direct current in the desired direction through the trip coil 75. Preferably, the first pair of solid state switches include SCR, Q2, and transistor Q3. SCR Q2 is activated in response to output 86 of the trip circuit 74. $Q_3$ is connected between the B+ bus and the trip coil 75. $Q_3$ also has base resistor $R_3$ which is connected to $Q_2$ such that when $Q_2$ is turned on, base drive is provided through resistor $R_3$ to $Q_3$ which turns $Q_3$ on. The operation of the circuit will be discussed in further detail below.

The second pair of solid state switches preferably includes transistor $Q_1$, and transistor $Q_4$ shown in FIG. 4. Transistor $Q_1$, is connected between the same end of trip coil 75 as transistor $Q_3$ and the combination of diode $D_1$ and resistor $R_5$. Diode $D_1$, and resistor $R_5$ are connected in the circuit such that the voltage across $D_1$ and $R_5$ is nearly equal to the voltage across $R_2$. $R_2$ and $R_1$ form a voltage divider through which $I_1$ flows. When $I_1$ varies, the voltage across $R_2$ varies and the voltage across $D_1$-$R_5$ varies as well.

Transistor $Q_4$ is connected in the circuit between the B+ bus and the end of flux shunt trip coil 75 opposite the end to which $Q_1$ is connected. Base drive is provided to $Q_4$ under appropriate conditions through base resistor $R_4$ which is connected to transistor $Q_1$.

In operation, a predetermined threshold value is chosen which is a value less than the trip current value for the breaker. This threshold value is chosen based upon the level at which it is desired that the magnetic field is to aid the permanent magnet 42 (FIG. 2) to assure that the breaker does not trip too soon. The threshold value is a value less than the trip current but at which the external field discussed above may cause nuisance tripping. In the circuit of FIG. 4, R1 and R2 are chosen such that if the breaker current is less than the predetermined threshold value, then the voltage across R2 is not enough to turn on transistor Q1. In addition, if a trip signal has not been initiated by trip circuit 74, then the portion of the control circuit which controls the direction of current is not active and the trip coil is not energized. As mentioned above, the portion of the circuit which controls the direction of current includes transistor Q1, SCR Q2, transistor Q3 and transistor Q4.

Figure 5:
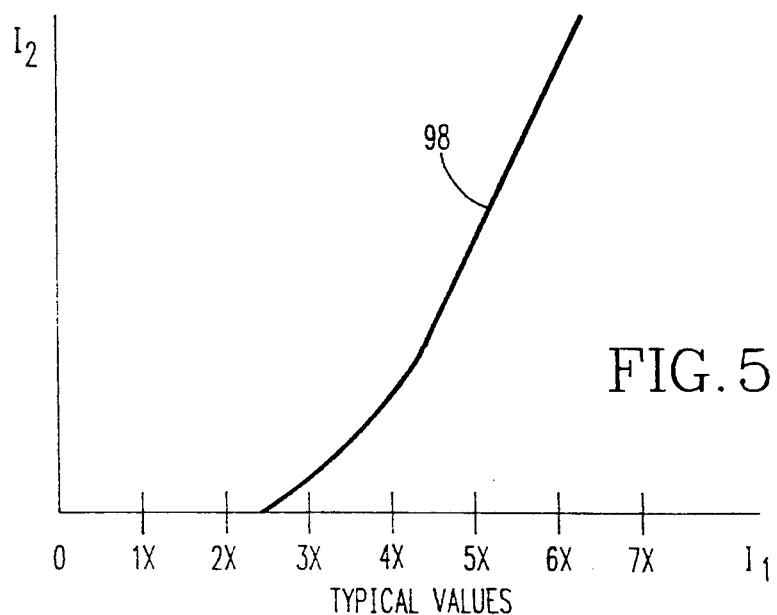
FIG. 5 is a graph of a current proportional to the current through the breaker along the X-axis vs. current through the flux shunt trip coil in the assisting direction along the Y-axis.

For breaker currents above the predetermined threshold value but below that required to activate the trip circuit, the voltage drop across $R_2$ and similarly across D1 and $R_5$ will be sufficient to turn Q1 on. In this case, transistor $Q_1$, diode D1 and resistor $R_5$ act as an emitter follower circuit so that the current through the trip coil will be proportional to the input current $I_1$ minus the threshold value. A typical curve 98 of $I_2$ plotted along the Y-axis versus $I_1$ along the X-axis is shown in FIG. 5.

Returning to FIG. 4, Q2 and Q3 are off because Q2 was not energized by a trip signal from trip circuit 74. However, with Q1 conducting, transistor Q4 is turned on by way of base resistor R4. This causes the current to flow from the B+ bus through Q4 and through the flux shunt trip coil 75 in the assisting direction designated by arrow 92. As stated hereinbefore, when the trip coil current flows in the assisting direction, magnetic flux is generated which aids the flux of the permanent magnet. The combined forces of the aiding flux and the flux of the permanent magnet retain the plunger in its retracted position. In this way, the breaker will not trip while the current value remains in the range which is above the predetermined threshold value yet below the trip value.

If the trip current condition is reached, trip circuit 74 will initiate a trip signal at lead 86 which turns on Q2. Transistor Q3 is thereby turned on by way of base resistor R3. Since Q3 is now on, the base drive is removed from Q4 causing it to turn off. If a current was flowing in the aiding direction through Q4 prior to a trip, it flows back to the B+ bus by way of D2. The current in the aiding direction is then driven to zero by the B+ voltage and then starts to flow in the opposite direction through Q3 and Q2. Now the current flows through trip coil 88 in the trip direction as shown by arrow 90. When the current through coil 88 builds to a high enough value, a magnetic flux will be generated which reduces or cancels that of the permanent magnet in which case the spring force will overcome the magnetic forces and plunger 28 (FIG. 3) will be released to its trip position to trip the circuit breaker.

In addition, when Q2 is turned on by the trip signal from the trip circuit 74, some of the $I_1$ current is shunted away from R2 by way of D3 and Q2. This has two effects. It provides a holding current for Q2 and it drops the voltage across R2 enough so that Q1 turns off.

It should be appreciated that the circuit of the present invention does not require significant additional space in the existing flux shunt trip device because the invention only adds a few small inexpensive components to the existing circuitry. The control circuitry overcomes the effects of magnetic fields from external electrical components. The circuitry may be used in any situation in which it is desired to reverse current in order to change the direction of magnetic flux in an electro-magnetic circuit.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalents thereof.

What is claimed is:

1. A flux shunt trip device in a circuit breaker associated with an electrical conductor, said circuit breaker having a pair of separable contacts movable between a closed position and an open position in response to a predetermined current condition, comprising:
    plunger means operatively associated with said contacts in said circuit breaker and movable between an extended position and a retracted position, said plunger means in said extended position causing said contacts to open;
    biasing means for urging said plunger means toward said extended position;
    permanent magnet means operatively positioned adjacent said plunger means such that a first magnetic flux generated by said permanent magnet attracts said plunger means toward said retracted position against a force of said biasing means;
    trip coil means adjacent said plunger means, said trip coil means when energized with current flowing in a first direction therethrough generates a second magnetic flux, opposing said first magnetic flux to substantially neutralize said first magnetic flux so that said plunger means is urged by said biasing means into said extended position;
    trip circuit means operatively associated with said conductor means for generating a trip signal when said predetermined current condition is met; and
    control circuit means connected to said trip coil means and including means responsive to said trip circuit means for directing current through said trip coil means in said first direction in response to a trip signal and selectively directing current through said trip coil means in a second direction opposite to said first direction in the absence of said trip signal.

2. The flux shunt trip device of claim 1 wherein said control circuit means also has means responsive to current in said conductors so that current through said trip coil means is directed through said trip coil means in said opposite direction only when current in said conductors is above a predetermined threshold.

3. The flux shunt trip device of claim 2 wherein said control circuit means includes:
   a first pair of solid state switches, including a first switch responsive to said trip signal such that said trip signal turns said first switch on, and a second switch having means responsive to said first switch so that said first switch turning on activates said second switch, said first and second switches when turned on directing current through said trip coil in said first direction; and
   a second pair of solid state switches including a third switch responsive to said means responsive to said current in said conductors such that said third switch turns on when said current is above said predetermined threshold, and a fourth switch responsive to said third switch such that when said third switch is turned on, said fourth switch is turned on and current is directed through said trip coil means in said second direction.

4. The flux shunt trip device of claim 3 wherein said first switch comprises SCR means operatively connected to said trip circuit means such that said trip signal from said trip circuit means activates said SCR means when said current through said conductor is at said predetermined current condition; and
   said second switch comprises first transistor means operatively associated with said SCR means said first transistor means connected between said power supply means and a first end of said trip coil means, and said first transistor means having first base resistor means connected between a base thereof and said SCR means, such that when said SCR means is activated by said trip circuit, base drive is provided to said first transistor means through said first base resistor means, to cause current to flow from said power supply means through said first transistor means through said trip coil means in said first direction generating said second magnetic flux opposing said first magnetic flux thereby releasing said plunger means.

5. The flux shunt trip device of claim 4 wherein said third switch comprises second transistor means connected to said means responsive to current in said conductors so that said second transistor means turns on at a predetermined threshold value; and
   said fourth switch comprises third transistor means having second resistor means connected at a base thereof, said second resistor means connected to said second transistor means such that when said second transistor means turns on, base drive is provided through said second resistor means to turn said third transistor means on, and said third transistor means having an emitter connected to receive input current from said power supply means and a collector leading to an opposite end of said trip coil means such that when said third transistor means is activated by said base drive applied through said second resistor means, current flows through said trip coil means in said second direction to generate said second magnetic flux in a direction aiding said first magnetic flux to assist in maintaining said plunger means in said retracted position, and said second resistor means also being connected with respect to said transistor means such that when said first transistor means is activated by said SCR means in response to a trip signal, said base drive is removed from said third transistor means to turn said third transistor means off whereby current begins to flow in said first direction to generate said second magnetic flux opposing said first magnetic flux and ultimately releasing said plunger means.

6. The flux shunt trip device of claim 2 in combination with a circuit breaker having multiple conductors, each conductor carrying one phase of the current in an associated power line, further comprising
   input subcircuit means including auctioneering circuit means comprising bridge circuit means associated with each phase conductor for rectifying said current for that phase and said bridge circuit means associated with each said phase connected together such that said auctioneering circuit means generates an output signal which is proportional to the highest current value from the phase conductors, said output signal being supplied as an input signal to said trip circuit means and said means responsive to current in said conductors.

* * * * *